United States Patent
Halabian et al.

(10) Patent No.: US 10,848,981 B2
(45) Date of Patent: Nov. 24, 2020

(54) SYSTEM AND METHOD FOR SCALABLE RADIO NETWORK SLICING

(71) Applicant: Telefonaktiebolaget LM Ericsson (publ), Stockholm (SE)

(72) Inventors: Hassan Halabian, Ottawa (CA); Afshin Sahabi, Kanata (CA); Mike Skof, Nepean (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/341,125

(22) PCT Filed: Oct. 20, 2017

(86) PCT No.: PCT/IB2017/056549
§ 371 (c)(1),
(2) Date: Apr. 11, 2019

(87) PCT Pub. No.: WO2018/073809
PCT Pub. Date: Apr. 26, 2018

(65) Prior Publication Data
US 2019/0320325 A1  Oct. 17, 2019

Related U.S. Application Data

(60) Provisional application No. 62/411,339, filed on Oct. 21, 2016.

(51) Int. Cl.
*H04W 16/18* (2009.01)
*H04W 24/10* (2009.01)
*H04W 84/18* (2009.01)

(52) U.S. Cl.
CPC .......... *H04W 16/18* (2013.01); *H04W 24/10* (2013.01); *H04W 84/18* (2013.01)

(58) Field of Classification Search
CPC ..... H04W 24/02; H04W 84/18; H04W 16/18; H04W 24/10; H04W 28/08; H04W 40/32;
(Continued)

(56) References Cited

U.S. PATENT DOCUMENTS

2003/0012167 A1* 1/2003 Benveniste ............. H04L 47/14
370/338
2009/0092112 A1  4/2009 Kim et al.
(Continued)

OTHER PUBLICATIONS

International Search Report and Written Opinion of the International Searching Authority, PCT/IB2017/056549, dated Jan. 15, 2018, 10 pages.
(Continued)

*Primary Examiner* — Mewale A Ambaye
(74) *Attorney, Agent, or Firm* — Sage Patent Group (57) ABSTRACT

A method and node are disclosed. According to one aspect, a method includes receiving scan reports from a plurality of access points, AP, and partitioning a wireless communication network into clusters of APs for which scan reports are received, the APs being partitioned into clusters based on neighbor relationships, there being a first limit to a number of APs that can be in a cluster. In some embodiments, the node is a manager node such as a self-organizing network (SON) manager node.

13 Claims, 7 Drawing Sheets

(58) Field of Classification Search
CPC .. H04L 41/0886; H04L 41/0893; H04L 41/12
See application file for complete search history.

(56) References Cited

U.S. PATENT DOCUMENTS

| | | | |
|---|---|---|---|
| 2009/0095112 A1* | 4/2009 | Buckingham | B25J 9/06 74/490.05 |
| 2009/0201846 A1* | 8/2009 | Horn | H04W 72/1263 370/315 |
| 2011/0116489 A1* | 5/2011 | Grandhi | H04W 16/04 370/338 |
| 2014/0036714 A1* | 2/2014 | Teng | H04W 24/02 370/252 |
| 2015/0365887 A1* | 12/2015 | Tong | H04W 4/029 370/328 |
| 2016/0262038 A1 | 9/2016 | Dunn et al. | |
| 2017/0245190 A1* | 8/2017 | Katar | H04W 36/14 |
| 2019/0320325 A1* | 10/2019 | Halabian | H04W 24/10 |

OTHER PUBLICATIONS

Krishnan R et al, Efficient clustering algorithms for self-organizing wireless sensor networks, Ad Hoc Networks, Elsevier, Amsterdam, NL, vol. 4, No. 1, Jan. 1, 2006, XP027982388, pp. 36-59.

* cited by examiner

SYSTEM AND METHOD FOR SCALABLE RADIO NETWORK SLICING

This application is a 35 U.S.C. § 371 national stage application of PCT International Application No. PCT/IB2017/056549 filed on Oct. 20, 2017, which in turn claims domestic priority to U.S. Provisional Patent Application No. 62/411,339, filed on Oct. 21, 2016 the disclosures and content of which are incorporated by reference herein in their entirety.

TECHNICAL FIELD

This disclosure relates to wireless communications, and in particular, to scalable radio network slicing.

BACKGROUND

Wireless local area networks (WLAN) provide short range (local) wireless access to the network users based on IEEE 802.11 standards. The IEEE 802.11 standard s define two modes of network access for WLAN clients namely, ad hoc and infrastructure modes. While in the ad hoc mode, wireless stations connect to each other in a peer-to-peer fashion, in the infrastructure mode, the wireless connectivity is provided by using wireless access points (AP). The infrastructure mode is the more appropriate mode for providing Internet access to the wireless users (non-AP stations). In this mode, the APs are responsible for distribution of Internet access to the users. Most of the WLAN networks deployed by the Internet providers are working in the infrastructure mode. In some embodiments of this disclosure it is assumed that WLANs operate in the infrastructure mode.

A WLAN is composed of a set of Basic Service Sets (BSSs) which is defined as one AP with its associated clients (users). Each BSS is known by a BSSID (BSS Identifier) which is the MAC address of the AP in the BSS. An Extended Service Set (ESS) is a set of connected BSSs. The APs in an ESS are connected through a common distribution system. Each ESS has an ID which is called SSID (Service Set Identifier). WLAN Internet providers deploy their network by deploying the ESSs (BSSs) over the desired coverage area. For example, all the APs (BSSs) in a shopping center with the same SSID build the ESS for the shopping center. A service provider provides Internet access to its clients through the deployed ESSs.

As noted, WLANs are operating based on IEEE 802.11 standards and therefore they are called 802.11 WLANs. The IEEE 802.11 standards define the PHY (Physical) and MAC (Medium Access Control) specification for the WLAN stations (AP and users). The performance of the access from the AP to the clients is controlled by changing the PHY and MAC layer parameters and functionalities in the AP and also in the wireless device users. In one BSS, the AP is responsible for controlling and optimizing the PHY and MAC layer parameters. The AP can do this based on the local information from the BSS. Examples of MAC and PHY layer parameters and functionalities include operating channel, transmission power, rate adaptation, beacon rate and power, etc., while the MAC and PHY performance optimization can be distributed or done locally by each AP in each BSS.

Another strategy is to perform the network optimization globally and centrally over all the BSSs. The latter methodology provides a centralized network management framework for optimizing WLAN networks. Note that a centralized solution should result in a better network-wide performance optimization rather than the distrusted method. This is because a centralized solution will take the correlation and impacts of BSSs into account for network optimization. Therefore, centralization will result in a better network resource allocation.

To clarify this issue, consider for example the problem of channel allocation in WLAN networks. In a local channel selection scheme, each AP chooses an operating channel based on the RSSI (received signal strength identifier) on each channel. For instance the AP chooses the channel with the least RSSI. In this local channel selection scheme, an AP does not have the RSSI observed by other APs and the AP only acts based on its local information. The channel selected by the AP might improve its BSS performance but the channel selection might also deteriorate the performance of the neighboring BSSs.

The channel changes in the neighboring BSSs can also affect the performance of a reference BSS. This behavior may not result in a global optimal channel allocation to the BSSs in an RF neighborhood. Local channel allocation might also result in channel changes being caught in a loop. A better approach is to collect all required information over all BSSs and then select the best channel plan for the network in a central node. A centralized channel selection will consider the impact of all the BSSs on each other. In WLAN networks, transmissions of co-channel BSSs impact each other either by collisions or by adding interference to the received signal. Furthermore co-channel APs should share the channel-time fairly. Considering all these effects, it may be concluded that a central channel selection can provide a better and more robust channel plan for the network.

Recently, Wi-Fi Internet providers have shown their interest in developing Self-Organizing Network (SON) managers for controlling and optimizing their WLAN networks. A SON manager is responsible for optimizing the PHY and MAC layer parameters and network settings of the BSSs in a WLAN. The primary goal of a Wi-Fi manager node is to provide efficient and vendor agnostic Wi-Fi radio resource management services in the presence of a large and dynamically changing number of APs over various traffic conditions. A vendor agnostic Wi-Fi SON manager is configured to run a number of Wi-Fi RRM algorithms by reading some input parameters from the network and writing the output parameters (Wi-Fi RRM configuration settings) into the APs in the network. The inputs and outputs of these algorithms should be supported and be available in all the APs in the WLAN network. The Wi-Fi RRM configuration settings include PHY layer parameters, e.g., power, channel, channel bandwidth, MIMO and MU-MIMO configuration, data rate, etc. and also MAC layer parameters, e.g., CSMA/CA settings, clear channel assessment threshold, throughput, load balancing, traffic scheduling, QoS parameters, security parameters, association and disassociation parameters, etc. A SON manager node not only provides RRM services but also can be used for performance monitoring and management purposes.

SUMMARY

Some embodiments advantageously provide a method and apparatus for use in a node. According to one aspect, a method includes receiving scan reports from a plurality of access points and partitioning a wireless communication network into segments of APs for which scan reports are received.

According to another aspect, a method includes receiving scan reports from a plurality of access points, AP, and partitioning a wireless communication network into clusters of APs for which scan reports are received, the APs being partitioned into clusters based on neighbor relationships, there being a first limit to a number of APs that can be in a cluster.

According to this aspect, in some embodiments, the method further includes segmenting the clusters into segments, the APs in a segment being connected, there being a second limit to a number of APs that can be in a segment. In some embodiments, the segmenting is performed to achieve a minimization of connectivity of APs in different segments. In some embodiments, the method further includes adding a new AP to a cluster based on whether the cluster has APs that are neighbors of the new AP and whether the first limit would be exceeded if the new AP is added. In some embodiments, the method further includes merging two clusters when one cluster has a number of APs that falls below a minimum threshold. In some embodiments, the merging occurs if and only if merging the two clusters will not result in a cluster having a number of APs that exceeds the first limit. In some embodiments, the method includes comprising deleting an AP if the node does not receive a scan report from the deleted AP for a specified period of time. In some embodiments, the node is a node is a self-organizing network (SON) manager node.

According to another aspect, a slicer in a node is provided. The slicer includes processing circuitry including a memory and a processor. The memory is configured to store a list of APs organized by membership in a cluster and a segment. The processor is configured to receive scan reports from a plurality of access points, AP, and partition a wireless communication network into clusters of APs for which scan reports are received, the APs being grouped into clusters based on neighbor relationships, there being a first limit to a number of APs that can be in a cluster.

According to this aspect, in some embodiments, the processor is further configured to segment the clusters into segments, the APs in a segment being connected, there being a second limit to a number of APs that can be in a segment. In some embodiments, the segmenting is performed to achieve a minimization of connectivity of APs in different segments. In some embodiments, the processor is further configured to add a new AP to a cluster based on whether the cluster has APs that are neighbors of the new AP and whether the first limit would be exceeded if the new AP is added. In some embodiments, the processor is further configured to merge two clusters when one cluster has a number of APs that falls below a minimum threshold. In some embodiments, the merging occurs if and only if merging the two clusters will not result in a cluster having a number of APs that exceeds the first limit. In some embodiments, the processor is further configured to delete an AP if the node does not receive a scan report from the deleted AP for a specified period of time. In some embodiments, the node is a node is a self-organizing network (SON) manager node.

According to yet another aspect, a slicer in a manager node is provided. The slicer includes a scan report receiver module configured to receive scan reports from a plurality of access points, AP, and a clustering module configured to partition a wireless communication network into clusters of APs for which scan reports are received, the APs being grouped into clusters based on neighbor relationships, there being a first limit to a number of APs that can be in a cluster.

According to another aspect, a slicer in a node is provided. The slicer includes processing circuitry including a memory and a processor. The memory is configured to store a list of access points, APs. The processor is configured to receive scan reports from a plurality of APs, and partition a wireless communication network into segments of APs for which scan reports are received.

According to still another aspect, a slicer in a node is provided. The slicer includes a scan report receiver module configured to receive scan reports from a plurality of access points, APs, and a module configured to partition a wireless communication network into segments of APs for which scan reports are received.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Before describing in detail exemplary embodiments, it is noted that the embodiments reside primarily in combinations of apparatus components and processing steps related to scalable radio network slicing. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Figure 1:
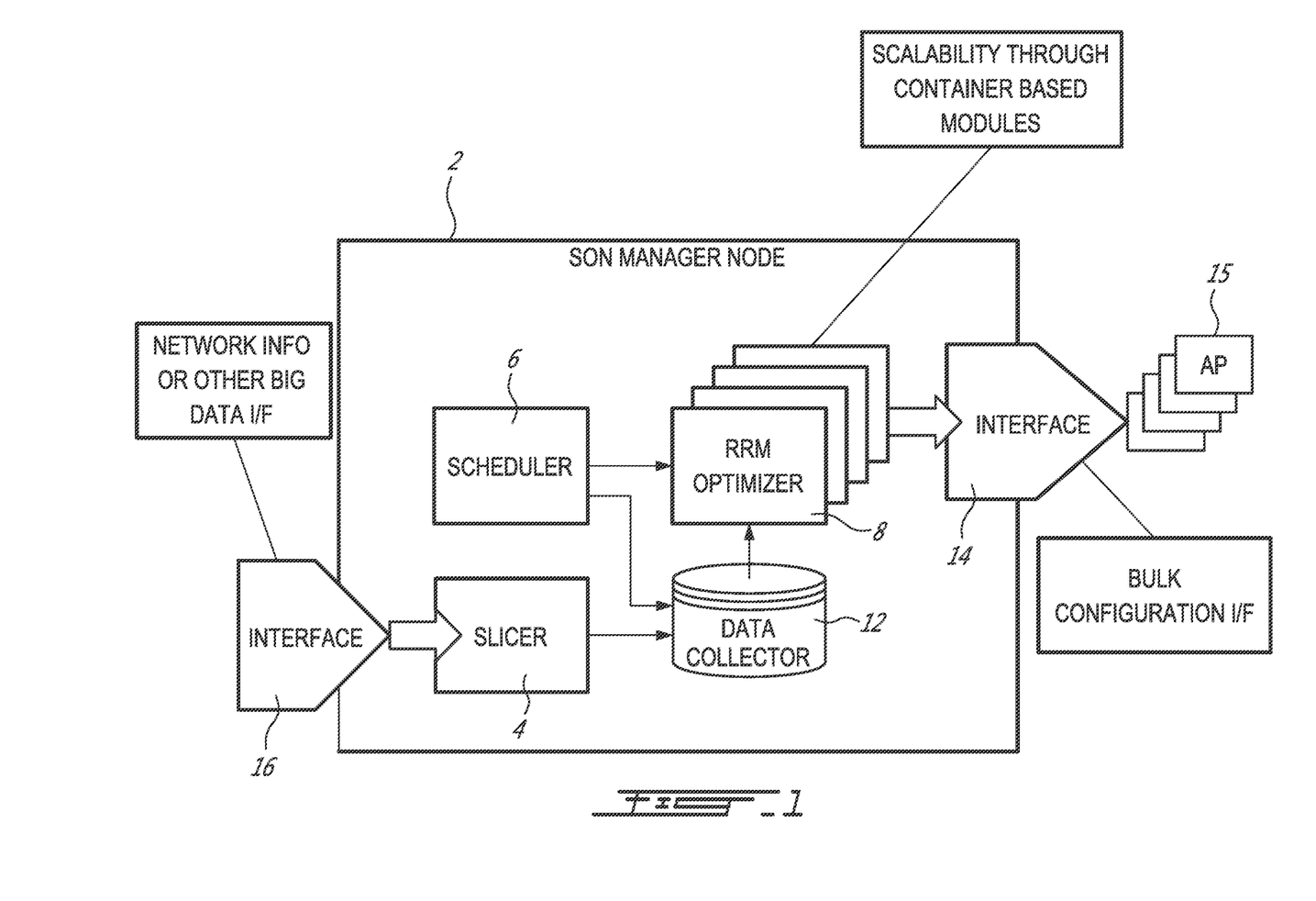
FIG. 1 is a block diagram of a SON manager node.

To have a scalable Wi-Fi solution for network management, a Wi-Fi architecture is presented in FIG. 1. Note that it is contemplated that the functions and processes described herein can be distributed over several physical nodes and/or devices. Note also that although some embodiments are described with reference to WiFi or WLAN and self-organizing networks (SON), the application of the methods and arrangements disclosed herein to other networks is contemplated. Thus, in some embodiments, a slicer 4 may be implemented in a SON manager node or other node, including even one or more APs 15.

FIG. 1 shows a Wi-Fi SON manager node 2 and its components. The slicer 4 is responsible for clustering and segmenting the network into smaller clusters and segments.

Each segment may contain a limited number of BSSs under control. The RRM optimizer 8 then optimizes the RRM configuration settings (e.g., tx power or operating channel) per network segment. Segmentation is done such that different segments have minimum RF impact on each other. The slicer 4 is the component of the Wi-Fi solution that provides scalability up to the level of tens of millions of APs. The slicer 4 functions to slice the controlled Wi-Fi network into multiple segments that are manageable by the RRM optimizer. The data collector 12 is responsible for collecting and smoothing the network statistics, traffic and network load data from the network for each segment and for each RRM time-slot, as well as collecting the RF survey data from each AP. Note that the functions of the slicer 4 need not be implemented in a SON manager node 2. Rather, slicer functionality may be implemented in other nodes.

The RRM optimizer 8 is composed of a set of RRM algorithms whose goal is to perform RRM optimizations for different RRM configuration parameters. While the RRM optimizer 8 is not limited to the type of the invoked optimization algorithms, using pro-active algorithms in the RRM optimizer 8 will provide a more scalable Wi-Fi solution. The RRM scheduler 6 is responsible for scheduling the RRM optimization performed by the RRM optimizer 8. The RRM scheduler 6 may control the efficiency of the whole RRM solution by avoiding performing unnecessary RRM optimization (which imposes processing overhead) and also by limiting the number of changes per AP. Too frequent RRM changes on one AP is not favorable since this might result in outage as well as wireless device user service disruption.

The Wi-Fi architecture includes two interfaces:

Network data or other big data interface 16: The manager 2 collects network data from the network (APs) which are required to run RRM optimization algorithms. This includes without limitation RF scan reports from the APs, traffic load statistics, channel utilization statistics, AP static configuration parameters, etc. As used herein, "big data" refers to large data sets that may be analyzed computationally to reveal patterns, trends, and associations. As such, big data interface 16 refers to an interface used to collect large data sets over a predetermined size threshold where the threshold is not fixed and depends upon the particular implementation and design needs.

Bulk configuration interface 14: After running optimization algorithms the optimal RRM configuration parameters need to be sent to the APs 15 so that the APs 15 can update their parameters. The manager 2 sends the bulk RRM configuration parameters using this interface.

The solution relies on slicing the entire network into smaller chunks called network segments. The purpose of a network slicer 4 is to perform network clustering and segmentation based upon the RF scan data collected by the SON manager node 2. RF scan data are the RF scan reports created by the APs 15 in which, using an active or passive channel scan, the APs 15 identify the neighboring APs on all the channels. The slicer 4 uses these scan reports and creates network segments of a limited sizes. The segments are formed such that they have minimum RF impact (interference) on each other. The segment sizes are all less than a maximum threshold which marks the largest of the number of APs 15 over which the RRM optimization algorithms can execute in a timely manner, i.e., having the RRM results ready before the next RRM scheduled time. The output of the slicer 4 is to keep updating the AP segments and clusters such that RRM optimizations can run over each segment separately and independently.

A problem with the existing Wi-Fi RRM solutions is lack of scalability

Too many RRM configuration changes might not be feasible in large networks since such will impose huge signaling and controlling load into the network.

They may impose huge processing and memory overhead to the SON manager node 2 which runs the RRM optimization framework.

They might introduce delay to the RRM signaling and controlling messages. Thus, after sending controlling messages from the SON manager node 2 to the APs 15, the network condition might have changed again and the new network changes will be ineffective. In other words, the RRM optimizer might not be able to track the dynamics of the network.

Most of the current reactive solutions are not vendor agnostic.

The optimization decisions in such solutions might be disruptive to customer methods.

The scalability of the solution in FIG. 1 is provided using a network slicing function. As noted, a purpose of the slicer 4 is to slice the entire network into smaller dense and independent segments. This should be done with the limited information available from the network at the SON manger node 2, which are the network RF scan reports from the APs 15. Moreover, the segmentation update and keeping track of the segments during the live operation of the SON manager node 2 is a challenge which has not been tackled before for a scalable SON manager node 2 supporting tens of millions of APs.

Embodiments provide a network slicer 4 which may operate solely based on the RF scan reports from the Wi-Fi APs. The same solution can be extended for any wireless network operating using different wireless technologies. RF scan data are the RF scan reports created by the APs in which, using an active or passive channel scan, the APs identify the neighboring APs on all the channels. The slicer 4 uses these scan reports and creates network segments of a limited sizes. The segments are formed such that they have minimum RF impact (interference) on each other. The segment sizes are all less than a maximum threshold which marks the largest of the number of APs over which the RRM optimization algorithms can run in a timely manner, i.e., having the RRM results ready before the next RRM scheduled time. The algorithm executed by the slicer 4 keeps updating the AP segments and clusters such that RRM optimizations can run over each segment separately and independently.

A challenge to conventional approaches is the lack of information regarding the placement of the APs including latitude and longitude, address, etc. The only information typically available in the SON manager node 2 are the RF scan reports from the APs which contains the RSSI levels of the neighboring APs. The scan report from each AP contains the list of the neighbor APs with the associated RSSI values as well as the operating channel.

Another challenge is that the slicer 4 should be simple such that the slicer 4 can support slicing of tens of millions of APs. Moreover, slicer 4 should update the segments without any disruption in the operation of the optimizer and in the live operation of the SON manager node 2.

Embodiments include a slicer 4 which, in one embodiment, executes four algorithms including an add function, delete function, clustering function and segmentation function. The notion of clustering is a key element that makes fast and scalable slicing function. The details of each function are presented in the following section.

The predictive RRM solution implemented by embodiments of the slicer 4 described herein has the following advantages:
- Operates solely based on the RF scan data collected from the APs of the network.
- Can be easily deployed in a cloud server.
- It is horizontally scalable (tens of millions of APs).
- Low signaling and controlling overhead.
- Modular and scalable architecture.
- Flexible for different network venues and traffic conditions.
- It is useful for large network performance monitoring/optimization including:
  - Providing a small scale view of the network
  - Operating channels
  - Capacity analysis
  - Quality of Service (QoS) provisioning
  - Channel-time utilization and busy-ness
  - Demand and traffic analysis The network slicer 4 described herein is the component of the Wi-Fi SON solution that provides scalability up to the level of tens of millions of APs. The slicer 4 slices the controlled Wi-Fi network into multiple segments that are manageable by the RRM optimizer 8.

The algorithm is designed to maintain segment relevancy to RRM objectives. In this regard, based on the RRM optimization and capabilities of the RRM optimizer, the maximum segment size is determined. This value is the largest size of a segment that can be handled by an RRM optimization thread. This is an input parameter that can be configured using either a configuration file or command line interface (CLI).

In some embodiments, the slicer 4 only relies on the background channel scan (BCS) reports coming from the APs. A BCS report contains the neighbor list and the associated RSSI values of each of the neighbors of an AP as well as their operating channel. An AP can get this information by passively scanning all the possible channels and listening to the beacon frames coming from the other neighboring APs. Another possibility is to scan the channel actively by sending probe frames.

In some embodiments, the slicer 4 does not need any start-up or warm-up phase, i.e. as soon as SON manager is turned on, the slicer 4 starts slicing the network upon the arrival and processing of Background channel scan (BCS) reports from APs.

The terms, neighbor, cluster and segment are defined as follows:
- Neighbor: Two APs are neighbors of each other if any of them sees the other one in its neighbor list. This is desired for the proper operation of the slicer functions, including adding, deleting, clustering and segmentation algorithms presented below.
- Cluster: Clusters are defined as RF disjoint network partitions. A clustering algorithm slices the entire network into RF disjoint partitions, e.g., cities, neighborhoods and communities. No AP in one cluster can see an AP in another cluster and any AP in one cluster is a neighbor of at least one AP in the same cluster.
- Segment: Segments are created by partitioning the clusters into segments of size less than MAX_SEG_SIZE. A property of the AP(s) in one segment is that they are tightly connected nodes while the segment size does not violate the MAX_SEG_SIZE. The nodes in one segment can be connected to the nodes in other neighboring segments. However, minimization of the connectivity and proximity of two segments in one cluster may be sought and achieved. A segmentation algorithm (presented below) partitions the clusters into one or multiple segments.

According to some embodiments, solutions provided herein include the following items:
- AP add function
- AP delete function
- Clustering algorithm
- Segmentation algorithm From the time the SON manager node 2 starts to run, two events might happen that can change the network topology.
- Adding new controlled APs 15 to the network. Example:
  - At the moment the SON manager node 2 is switched on the SON manager node 2 starts receiving BSC data from each controlled AP in the network.
  - An operator might add new APs 15 to their network to increase coverage or replace the old APs with new ones.
- Removing APs 15 from the network. Example:
  - An operator might remove some APs 15 or replace them with new APs 15.
  - AP malfunctioning It may be very computationally intensive to run a network-wide slicing algorithm after each AP addition or removal. Therefore, separate adding and delete functions that are responsible for adding and removing APs 15 from the segments in the live operation of the network are employed, in some embodiments. The AP adding and delete functions are designed such that new APs 15 are added and old APs 15 are deleted and removed seamlessly without violating the operation of the RRM optimizer 8.

The adding function works as follows. Upon processing a BCS report, a check is made to see if the BCS report is coming from a new AP or an old one. If the BCS report comes from an old AP, the AP neighbor list is updated as well as its operating channel. If the AP is determined as a new AP, a cluster ID and a segment ID for this AP is determined. In one embodiment, the following rule may be used for adding the AP to a cluster/segment:

Add the AP to the segment that contains most of its neighbors if the segment size is strictly less than MAX_SEG_SIZE. The selected segment would be the destination for this new AP. Ties are broken arbitrarily.

If the AP has no neighbor in any of the segments or there exists no segment at all, a new cluster is created and the AP is added to this cluster. Also, a new segment with a unique ID is created and the new AP is added to this segment. If the segment sizes have reached MAX_SEG_SIZE, a new segment is created and the AP is added to this new segment. In this case, to assign a cluster ID to the new AP, the same cluster ID of one of the segments this AP has a neighbor in may be assigned.

After adding the new AP to the segments, the clusters should be updated. A reason is that by adding one new AP, two clusters might be connected and therefore they should merge. For merging, all the neighbors of the new AP should be checked to determine if the new AP has neighbors in other clusters. All of the neighbors are grouped into one single cluster with a unique ID for the merged cluster.

After all of the steps described above, a re-segmentation flag for the new AP is set. Notice that the adding function is not necessarily adding the APs to the segments and clusters optimally. Thus, the adding function may follow a fast but sub-optimal adding strategy. After adding an AP, a flag for the AP is set and then when the re-segmentation trigger time is reached (configured in the slicer configurations in units of hours) a re-segmentation algorithm for the cluster this AP belongs to is executed.

The delete algorithm removes an AP if the SON manager node 2 does not receive BCS report data from the AP for a specified period of time. Upon the removal of an AP from a segment, the records of the AP may be removed from the segments. If the removed AP is the last AP in that segment or cluster, the cluster ID and segment ID may be deleted as well. The removal of the AP might result in splitting the cluster the removed AP belonged to into two clusters. Therefore, after removing any AP, the re-clustering/re-segmentation flag for its cluster is set. Note that if a cluster is flagged for re-clustering and later on this cluster is merged with another cluster, the re-clustering flag is set for the newly created cluster as well.

Figure 2:
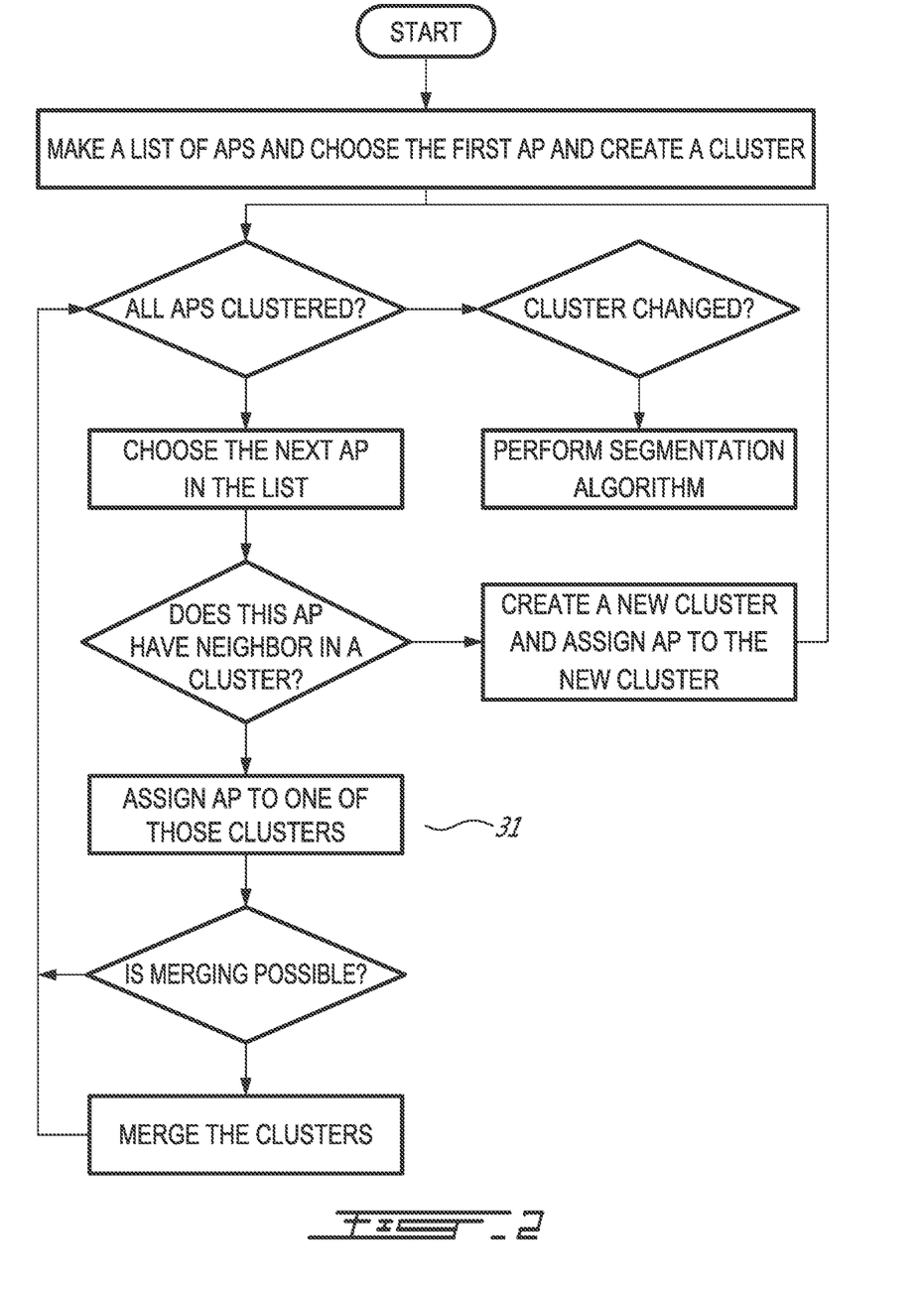
FIG. 2 is flowchart of an exemplary process for clustering performed by a slicer constructed in accordance with principles set forth herein.

When the re-clustering trigger time is reached, the re-clustering and re-segmentation algorithms are executed. The re-clustering algorithm is executed first on the clusters for which the re-clustering flag is set. The re-clustering trigger time is a configurable parameter of the slicer 4. In one embodiment, the clustering/re-clustering algorithm is as shown in the flowchart of FIG. 2. Initially there exists no cluster. The first node creates the first cluster. For the next APs the algorithm goes over the APs sequentially and adds them to the clusters if they have any neighbor in the created clusters. Furthermore, the algorithm checks if by adding the AP to a cluster any cluster merging is possible. This is done by checking if the AP has neighbors in multiple clusters. At the end, when all APs are processed, if the cluster formation did change (possibly split into multiple clusters), the segmentation algorithm is called afterwards. If the cluster remains unchanged, there is no need for re-segmentation.

A segmentation/re-segmentation algorithm is employed to partition the APs of a cluster into segments. The segmentation algorithm is called for the clusters in which there is at least one AP with the segmentation flag set. As noted, a segmentation flag is set for the new AP arrivals. In one implementation, the segmentation algorithm is composed of three phases:

K-means segmentation
Segment splitting
Segment merging

K-means segmentation will segment the cluster into a number of segments whose size is less than MAX_SEG_SIZE. The details of the K-means segmentation are discussed below.

After this step, there might be a few segments whose nodes are not entirely connected as a united segment. In other words, the segment has two or more disjoint sub-segments. More specifically, in some cases no AP in one sub-segment appears in the neighbor list of APs in other sub-segments. Therefore, after k-means segmentation, a clustering function is performed for all the segments derived from the k-means algorithm to split them to disjoint segments. To do so, the same algorithm and same function introduced earlier for clustering can be used.

After the first two steps some small segments may be formed for which it is not desirable to run separate RRM optimizations. Thus, a function called, segment merging whose responsibility is to merge the small segments into larger ones is called. The function does so, by attaching the small segments to the neighboring ones who have the most proximity to the small segments such that the MAX-SEG_SIZE limit is not exceeded.

The merging continues until all the segment sizes are above a MIN_SEG_SIZE. Note that segment merging is the last phase of the segmentation algorithm which only happens when the re-segmentation algorithm is called, i.e., after clustering (if re-segmentation is required) or when re-segmentation is triggered for a cluster. At this phase the algorithm includes calculation of the proximity of each small segments with all the ones derived from the previous phase of the segmentation algorithm (i.e., segment splitting).

In the re-segmentation algorithm, the "k-means" algorithm is used to segment a cluster. The parameters of the k-means algorithm are the following:

Neighbor graph of the cluster: the algorithm learns which APs 15 in a cluster is a neighbor of an AP for each AP. To each node, one vector is associated which is created based on its neighbor list. Assuming that there are n nodes in the cluster, for each node a row vector of size n is created. This vector is called a neighbor relationship vector.

The desired number of segments: The number of desired segments is set as the ceiling of the ratio of the cluster size and the MAX_SEG_SIZE.

A measure of distance between the nodes in the cluster: The distance of any two nodes is defined as one minus the cosine of the included angle between the neighbor relationship vectors, i.e., the distance of two nodes that have lots of common neighbors will be smaller than the distance of two nodes that have less common neighbors.

Figure 3:
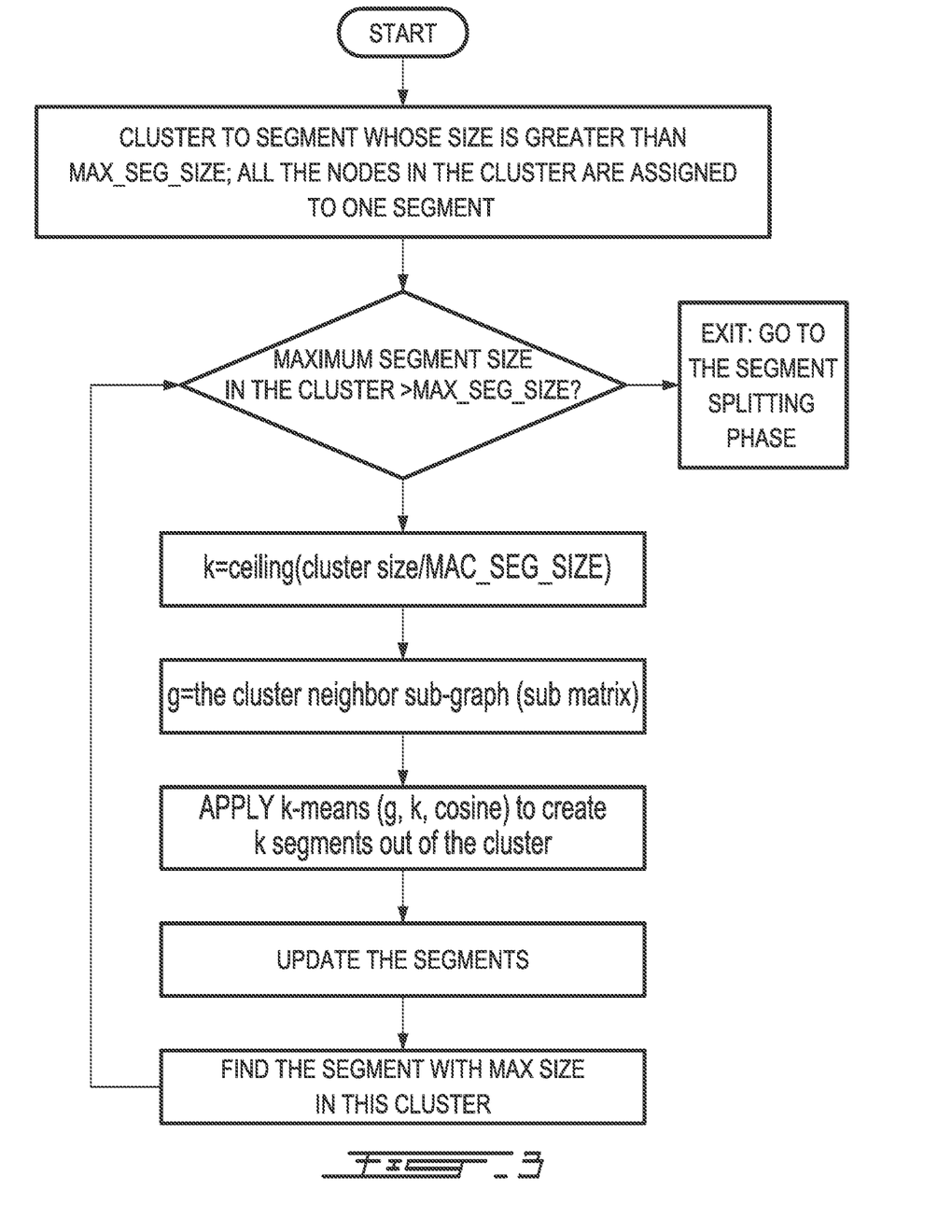
FIG. 3 is a flowchart of an exemplary process for segmentation performed by the slicer.

Notice that after one round of segmentation process there might still exist some segments whose size is greater the MAX_SEG_SIZE. The above procedure is repeated until the maximum segment size among all the segments is less than MAX_SEG_SIZE. The K-means segmentation algorithm is presented in FIG. 3.

As explained above, since the k-means algorithm segments the clusters into a fixed number of segments, it is probable that some final segments (especially the ones that have the largest averaged node-to-centroid distance) are not formed as single unified segments, i.e., a cluster may be is composed of some disjoint sub-segments. In one embodiment, for segment splitting, the clustering algorithm presented in FIG. 2 is executed, but only for the segments generated by the k-means segmentation algorithm. Note that the same function and the same code for segment splitting as was used for the clustering algorithm can be used for the k-means segmentation algorithm. The result of segment spitting would be a number of disjoint segments whose size is less than MAX_SEG_SIZE. However, during this process, a small segment might be created. Those small segments can be attached to the neighboring segment if they have enough room to accept them and create larger segments.

As noted, one aspect of segment merging allows for the merging of small segments with their neighbor segments to create larger segments. The algorithm finds the smallest segment size and check to see if the smallest segment can attach to a neighboring segment or not. To do so, after finding the smallest segment, the merge algorithm calculates the proximity of the smallest segment to each of the segments in the cluster. In one embodiment, proximity is defined as follows:

Proximity of two segments=number of connectivity between the two segments

To calculate the proximity of two segments A and B the number of neighbors of segment A nodes in segment B are to be added, i.e., for each of the nodes of segment A, the number of neighbors they have in segment B are added.

Figure 4:
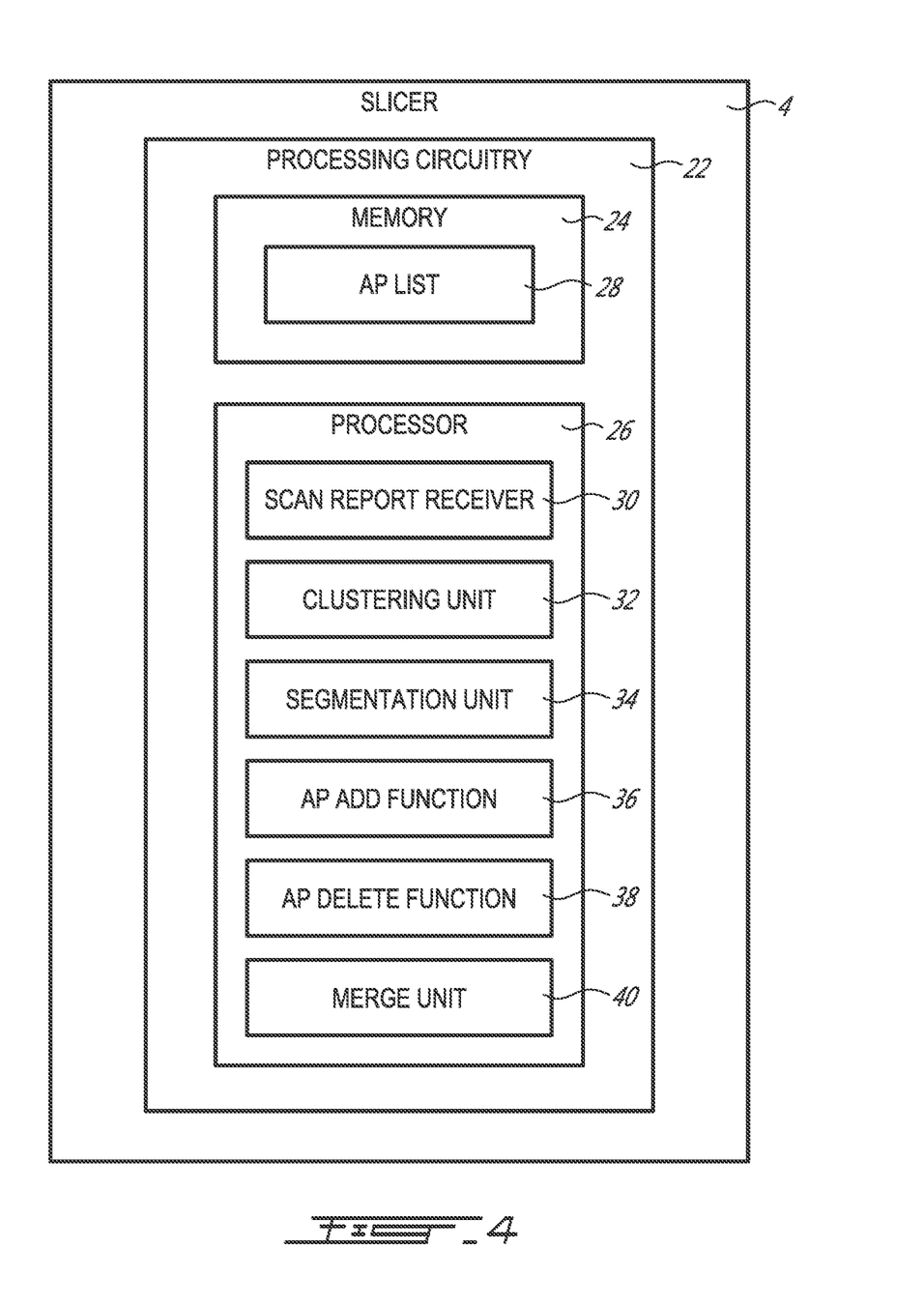
FIG. 4 is a block diagram of a slicer constructed in accordance with principles set forth herein.

FIG. 4 is a block diagram of a slicer 4 constructed in accordance with some embodiments described herein. The slicer 4 has processing circuitry 22. In some embodiments, the processing circuitry 22 may include a memory 24 and a processor 26, the memory 24 containing instructions which, when executed by the processor 26, configure processor 26 to perform the one or more functions described herein. In addition to a traditional processor and memory, processing circuitry 22 may comprise integrated circuitry for processing and/or control, e.g., one or more processors and/or processor cores and/or FPGAs (Field Programmable Gate Array) and/or ASICs (Application Specific Integrated Circuitry).

Processing circuitry 22 may comprise and/or be connected to and/or be configured for accessing (e.g., writing to and/or reading from) memory 24, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by control circuitry and/or other data, e.g., data pertaining to communication, e.g., configuration and/or address data of nodes, etc. Processing circuitry 22 may be configured to control any of the methods described herein and/or to cause such methods to be performed, e.g., by processor 26. Corresponding instructions may be stored in the memory 24, which may be readable and/or readably connected to the processing circuitry 22. In other words, processing circuitry 22 may include a controller, which may comprise a microprocessor and/or microcontroller and/or FPGA (Field-Programmable Gate Array) device and/or ASIC (Application Specific Integrated Circuit) device. It may be considered that processing circuitry 22 includes or may be connected or connectable to memory, which may be configured to be accessible for reading and/or writing by the controller and/or processing circuitry 22.

The memory 24 is configured to store a list of APs organized by membership in a cluster and a segment. In some embodiments, the processor 26 executes the functions of the slicer 4 described herein. The processor 26 is configured to receive scan reports from a plurality of access points, AP, via a scan report receiver 30. The processor 26 is also configured to partition, via a clustering unit 32, a wireless communication network into clusters of APs for which scan reports are received, the APs being grouped into clusters based on neighbor relationships, there being a first limit to a number of APs that can be in a cluster. In some embodiments, the processor 26 is further configured to segment, via a segmentation unit 34, the clusters into segments, the APs in a segment being connected, there being a second limit to a number of APs that can be in a segment. The processor 26 may further be configured to add a new AP, via an AP add function 36, to a cluster based on whether the cluster has APs that are neighbors of the new AP and whether the first limit would be exceeded if the new AP is added. The processor may further be configured to delete an AP, via an AP delete function 38, if the SON manager node 2 does not receive a scan report from the deleted AP for a specified period of time. In some embodiments, the processor 26 may further be configured to merge, via a merge unit 40, two clusters when one cluster has a number of APs that falls below a minimum threshold, provided that merging the two clusters will not result in a cluster having a number of APs that exceeds the first limit.

In another embodiment, the memory 24 is configured to store a list of access points, APs. The processor 26 is configured to receive scan reports from a plurality of APs, and partition a wireless communication network into segments of APs for which scan reports are received.

Figure 5:
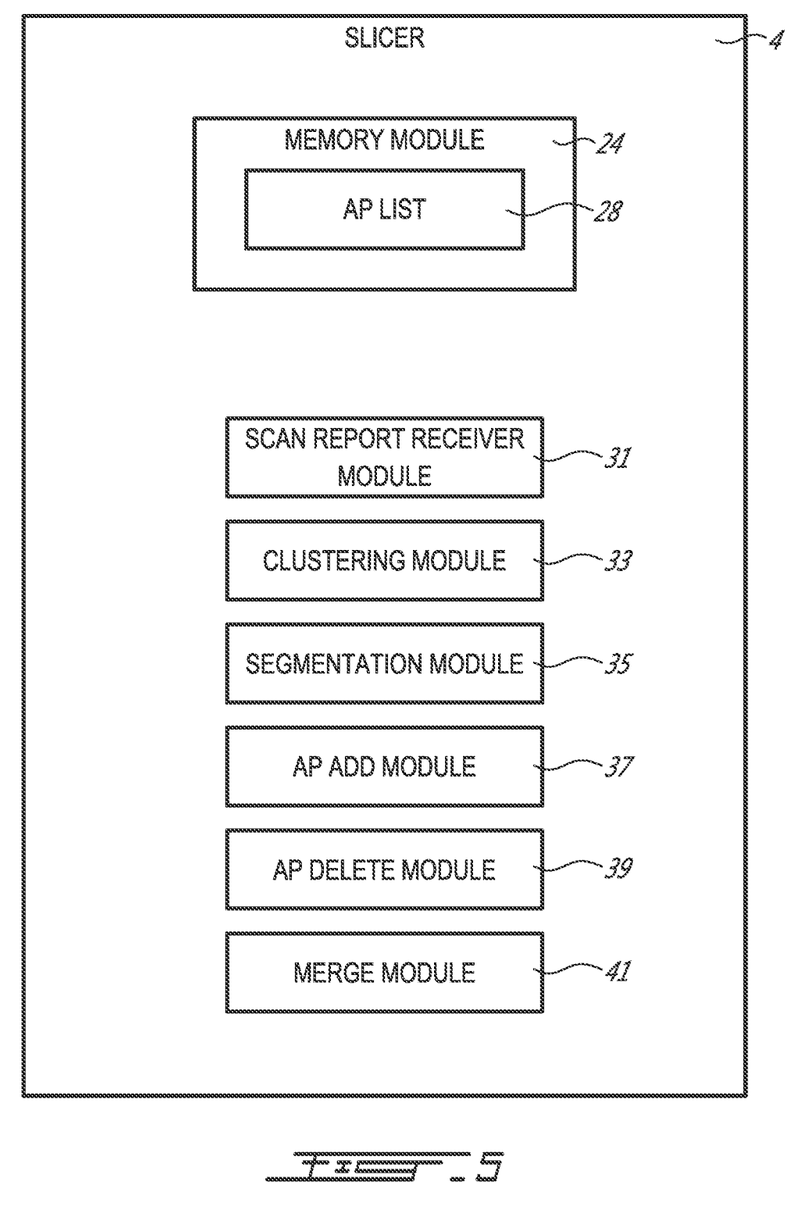
FIG. 5 is a block diagram of an alternative embodiment of a slicer implemented as software modules to be executed by a processor.

FIG. 5 is a block diagram of an alternative embodiment of a slicer 4 implemented as software modules to be executed by a processor. The slicer 4 includes a memory module 24 configured to store an AP list 28. The software modules include a scan report receiver module 31 configured to cause a processor to receive scan reports from a plurality of APs. A clustering module 33 is configured to cause the processor to partition a wireless communication network into clusters of APs for which scan reports are received. A segmentation module 35 is configured to cause the processor to segment clusters into segments. An AP add module 37 is configured to cause the processor to add new APs to clusters. An AP delete module 39 is configured to cause the processor to delete APs from clusters. A merge module 41 is configured to cause merger of two or more clusters.

In another embodiment, the slicer 4 includes a scan report receiver module 31 configured to receive scan reports from a plurality of access points, APs, and a module 35 configured to partition a wireless communication network into segments of APs for which scan reports are received.

Figure 6:
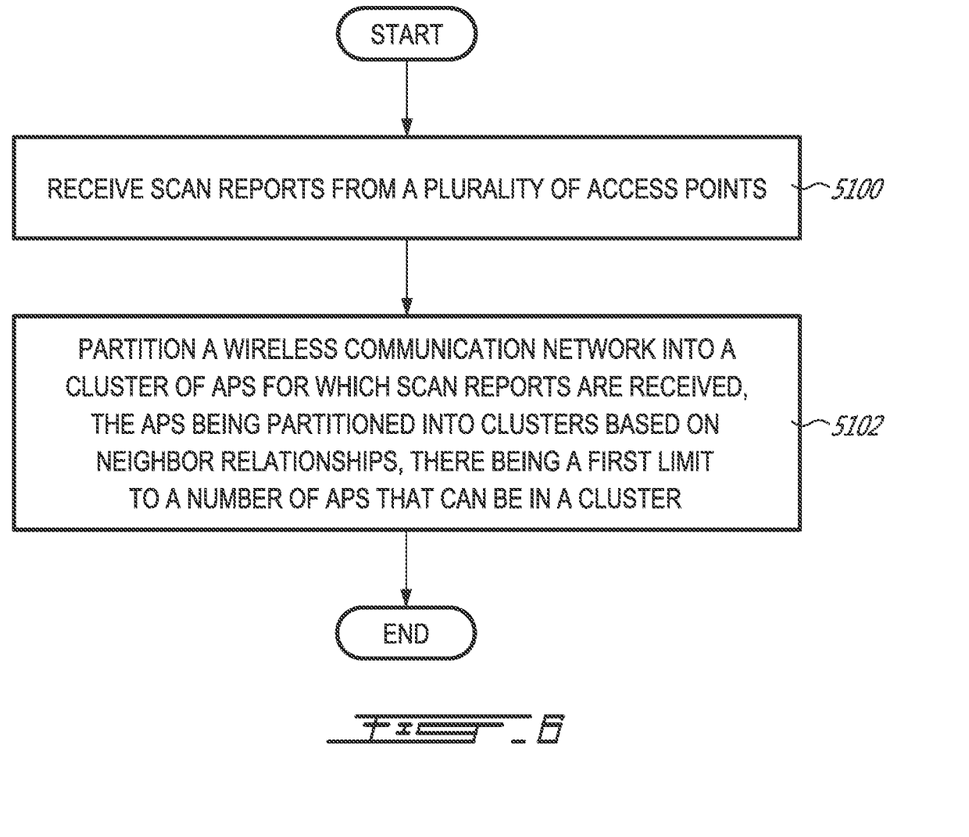
FIG. 6 is a flowchart of an exemplary process for operating the slicer.

FIG. 6 is a flowchart of an exemplary process performed by a slicer 4. The process includes receiving scan reports from a plurality of access points, AP (block S100). The process further includes partitioning a wireless communication network into clusters of APs for which scan reports are received, the APs being partitioned into clusters based on neighbor relationships, there being a first limit to a number of APs that can be in a cluster (block S102).

Figure 7:
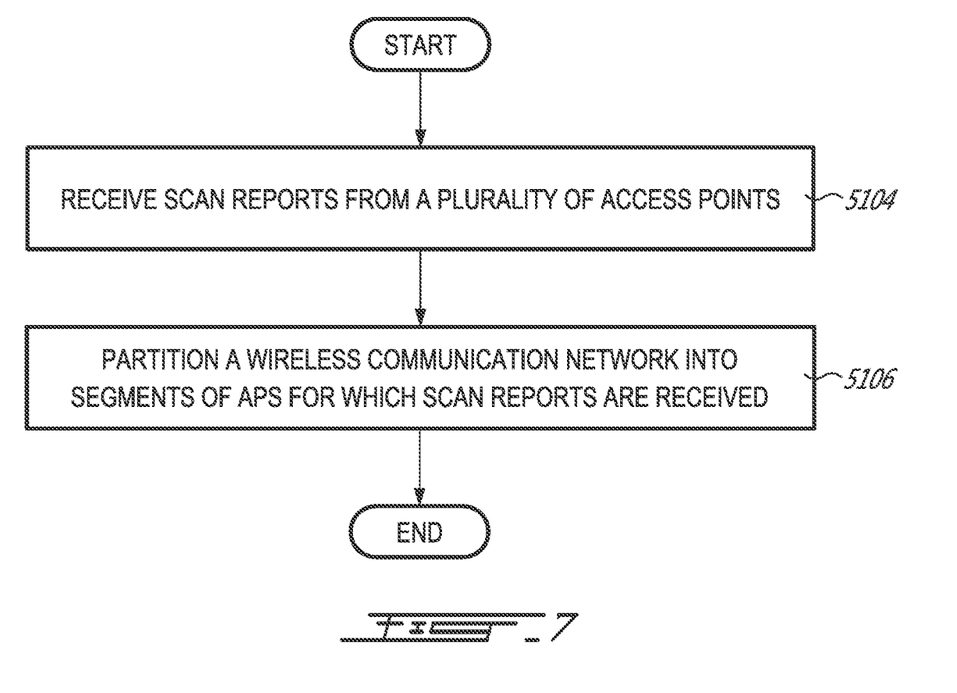
FIG. 7 is a flowchart of another exemplary process for operating the slicer.

FIG. 7 is a flowchart of another exemplary process performed by the slicer 4. The process includes receiving scan reports from a plurality of access points, AP (block S104). The process further includes partitioning a wireless communication network into segments of APs for which scan reports are received.

According to some embodiment of this disclosure. a network slicing solutions which operates based on the RF scan reports from the wireless entities are presented. The disclosed arrangements can operate without the geographical coordinates, i.e. latitude and longitude of the APs and provide network segments which are dense and at the same time maximally independent (i.e., with minimal RF impact on each other). The application of the network slicing is not limited to the Wi-Fi SON solution provided herein. Network slicing as described herein can be also useful for network performance monitoring since the network slicing can provide a finer view of the network through segments. Moreover, network slicing is helpful for quality of service (QoS) provisioning over the network. The solution is not just limited to Wi-Fi networks and can be applied to any wireless technology.

Some embodiments of this disclosure are scalable. The slicer 4 can operate without violating the operation of other pieces of the SON manager node and keeps track of the clusters and the segments of the network during live operation of the SON manager node 2. The slicer 4 does that by using fast algorithms for adding and deleting nodes from the segments and then running re-segmentation and re-clustering algorithms only on the impacted clusters of the network at the re-segmentation and re-clustering trigger times. Note that it is contemplated that the functions and processes described herein can be distributed over several physical nodes and/or devices and are not limited to implementation in a single device. For example, slicer 4 need not be implemented in a single physical SON manager node 2.

Abbreviation Explanation
AP Access Point
CSMA/CA Carrier Sensing Multiple Access/Collision Avoidance
DL Downlink
MAC Medium Access Control
PHY Physical layer
STA IEEE 802.11 station
UL Uplink
WLAN Wireless Local Area Network
RRM Radio Resource Management
SON Self-Organizing Network
ACC AP Channel Capacity
KPI Key Performance Indicator
Tx Transmit
Rx Receive
BSS Basic Service Set
RF Radio Frequency
RSSI Received Signal Strength Identifier
Some embodiments include:

Embodiment 0

A method for network slicing for use in node, the method comprising:
  receiving scan reports from a plurality of access points, AP; and
  partitioning a wireless communication network into segments of APs for which scan reports are received.

Embodiment 1

A method for network slicing for use in node, the method comprising:
  receiving scan reports from a plurality of access points, AP; and
  partitioning a wireless communication network into clusters of APs for which scan reports are received, the APs being partitioned into clusters based on neighbor relationships, there being a first limit to a number of APs that can be in a cluster.

Embodiment 2

The method of Embodiment 1, further comprising segmenting the clusters into segments, the APs in a segment being connected, there being a second limit to a number of APs that can be in a segment.

Embodiment 3

The method of Embodiment 2, wherein the segmenting is performed to achieve a minimization of connectivity of APs in different segments.

Embodiment 4

The method of Embodiment 1, further comprising adding a new AP to a cluster based on whether the cluster has APs that are neighbors of the new AP and whether the first limit would be exceeded if the new AP is added;

Embodiment 5

The method of Embodiment 1, further comprising merging two clusters when one cluster has a number of APs that falls below a minimum threshold.

Embodiment 6

The method of Embodiment 5, wherein the merging occurs if and only if merging the two clusters will not result in a cluster having a number of APs that exceeds the first limit.

Embodiment 7

The method of Embodiment 1, further comprising deleting an AP if the node does not receive a scan report from the deleted AP for a specified period of time.

Embodiment 8

The method of Embodiment 1, wherein the node is a self-organizing network, SON, manager node.

Embodiment 9

A slicer in a node, the slicer comprising:
  processing circuitry including a memory and a processor:
    the memory configured to store a list of APs organized by membership in a cluster and a segment; and
    the processor configured to:
      receive scan reports from a plurality of access points, AP; and
      partition a wireless communication network into clusters of APs for which scan reports are received, the APs being grouped into clusters based on neighbor relationships, there being a first limit to a number of APs that can be in a cluster.

Embodiment 10

The slicer of Embodiment 9, wherein the processor is further configured to segment the clusters into segments, the APs in a segment being connected, there being a second limit to a number of APs that can be in a segment.

Embodiment 11

The slicer of Embodiment 9, wherein the segmenting is performed to achieve a minimization of connectivity of APs in different segments.

Embodiment 12

The slicer of Embodiment 9, wherein the processor is further configured to add a new AP to a cluster based on whether the cluster has APs that are neighbors of the new AP and whether the first limit would be exceeded if the new AP is added.

Embodiment 13

The slicer of Embodiment 9, wherein the processor is further configured to merge two clusters when one cluster has a number of APs that falls below a minimum threshold.

Embodiment 14

The slicer of Embodiment 13, wherein the merging occurs if and only if merging the two clusters will not result in a cluster having a number of APs that exceeds the first limit.

Embodiment 15

The slicer of Embodiment 9, wherein the processor is further configured to delete an AP if the node does not receive a scan report from the deleted AP for a specified period of time.

Embodiment 16

The slicer of Embodiment 9, wherein the node is a self-organizing network, SON, manager node.

Embodiment 17

A slicer in a node, the slicer comprising:
a scan report receiver module configured to receive scan reports from a plurality of access points, AP; and
a clustering module configured to partition a wireless communication network into clusters of APs for which scan reports are received, the APs being grouped into clusters based on neighbor relationships, there being a first limit to a number of APs that can be in a cluster.

Embodiment 18

A slicer in a node, the slicer comprising:
processing circuitry including a memory and a processor:
  the memory configured to store a list of access points, APs; and
  the processor configured to:
    receive scan reports from a plurality of APs; and
    partition a wireless communication network into segments of APs for which scan reports are received.

Embodiment 19

A slicer in a node, the slicer comprising:
a scan report receiver module configured to receive scan reports from a plurality of access points, APs; and
a module configured to partition a wireless communication network into segments of APs for which scan reports are received.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, some embodiments of the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of some embodiments of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings which are limited only by the following claims.

What is claimed is:

1. A method for network slicing for use in node, the method comprising:
   receiving scan reports from a plurality of access points (APs);
   partitioning a wireless communication network into clusters of APs for which scan reports are received, the APs being partitioned into clusters based on neighbor relationships, there being a first limit to a number of APs that can be in a cluster; and
   deleting an AP if the node does not receive a scan report from the deleted AP for a specified period of time.

2. The method of claim 1, further comprising segmenting the clusters into segments, the APs in a segment being connected, there being a second limit to a number of APs that can be in a segment.

3. The method of claim 1, further comprising adding a new AP to a cluster based on whether the cluster has APs that are neighbors of the new AP and whether the first limit would be exceeded if the new AP is added.

4. The method of claim 1, further comprising merging two clusters when one cluster has a number of APs that falls below a minimum threshold.

5. The method of claim 4, wherein the merging occurs if and only if merging the two clusters will not result in a cluster having a number of APs that exceeds the first limit.

6. The method of claim 1, wherein the node is a self-organizing network (SON) manager node.

7. A slicer in a node, the slicer comprising:
   a processing circuitry configured to:
      store a list of access points (APs) organized by membership in a cluster and a segment;
      receive scan reports from a plurality of access points (APs);
      partition a wireless communication network into clusters of APs for which scan reports are received, the APs being grouped into clusters based on neighbor relationships, there being a first limit to a number of APs that can be in the cluster; and
      delete an AP if the node does not receive a scan report from the deleted AP for a specified period of time.

8. The slicer of claim 7, wherein the processing circuitry is further configured to segment the clusters into segments, the APs in a segment being connected, there being a second limit to a number of APs that can be in a segment.

9. The slicer of claim 7, wherein the processing circuitry is further configured to add a new AP to a cluster based on whether the cluster has APs that are neighbors of the new AP and whether the first limit would be exceeded if the new AP is added.

10. The slicer of claim 7, wherein the processing circuitry is further configured to merge two clusters when one cluster has a number of APs that falls below a minimum threshold.

11. The slicer of claim 10, wherein the merging occurs if and only if merging the two clusters will not result in a cluster having a number of APs that exceeds the first limit.

12. The slicer of claim 7, wherein the node is a self-organizing network (SON) manager node.

13. A slicer in a node, the slicer comprising:
   a processor configured to:
      receive scan reports from a plurality of access points (APs);
      partition a wireless communication network into clusters of APs for which scan reports are received, the APs being grouped into clusters based on neighbor relationships, there being a first limit to a number of APs that can be in a cluster; and
      delete an AP if the node does not receive a scan report from the deleted AP for a specified period of time.

* * * * *